Oct. 6, 1953  C. M. PERKINS  2,654,268
SHIFT CONTROL FOR AUXILIARY TRANSMISSIONS
Filed July 14, 1951  3 Sheets-Sheet 1
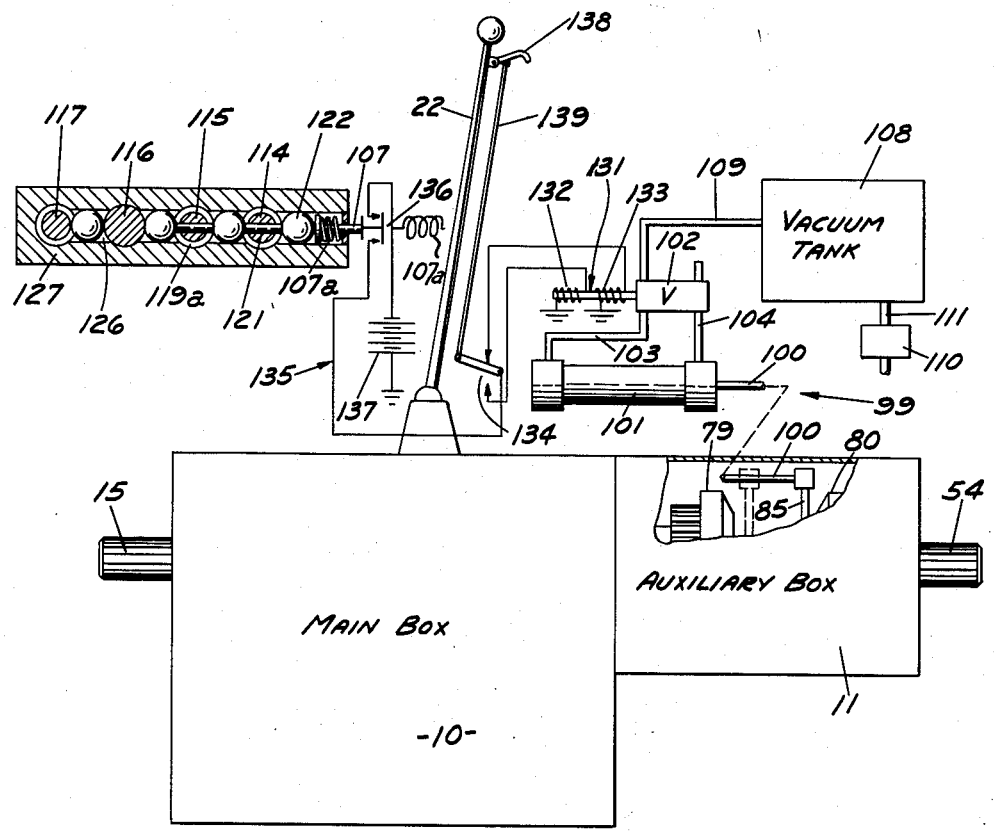
Fig. 1
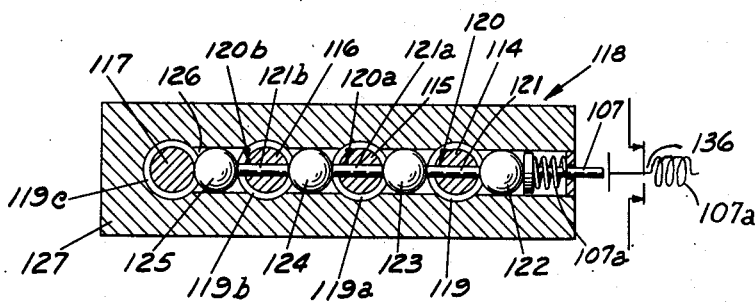
Fig. 2
INVENTOR.
CHARLES M. PERKINS
BY

Oct. 6, 1953     C. M. PERKINS     2,654,268
SHIFT CONTROL FOR AUXILIARY TRANSMISSIONS
Filed July 14, 1951     3 Sheets-Sheet 2

Inventor
CHARLES M. PERKINS
By
Attorney

Oct. 6, 1953                    C. M. PERKINS                    2,654,268
                    SHIFT CONTROL FOR AUXILIARY TRANSMISSIONS
Filed July 14, 1951                                          3 Sheets-Sheet 3

Inventor
CHARLES M. PERKINS
By
Attorney

Patented Oct. 6, 1953

2,654,268

UNITED STATES PATENT OFFICE 2,654,268

SHIFT CONTROL FOR AUXILIARY TRANSMISSIONS

Charles M. Perkins, Kalamazoo, Mich., assignor to Fuller Manufacturing Company, a corporation of Delaware Application July 14, 1951, Serial No. 236,817

9 Claims. (Cl. 74—745)

This invention relates in general to a device for controlling and effecting the shift of an auxiliary transmission in response to a predetermined movement in a main transmission associated therewith, and more particularly to such a device which is actuable by the interlock mechanism of the gear shift on the main transmission and which is arranged to effect shifting of said auxiliary transmission upon the arrival of said main transmission into neutral position.

In the application of Ludvigsen and Backus, Serial No. 133,404, a transmission assembly was disclosed comprising a main gear group and an auxiliary gear group connected in series with the main gear group. The auxiliary gear group was provided with a range of speed change ratios substantially equal to, and preferably slightly greater than, the range of speed ratios included within a selected portion of the main gear group. Disclosed with said two gear groups in said application was semi-automactic means actuable at the will of an operator for shifting said auxiliary gear group when the main gear group is in neutral position.

Through this arrangement, it is possible to shift the main and auxiliary gear groups from low position to high position, or vice versa, passing twice through the entire range of said selected portion of said main gear group with only one simultaneous shift of the gears in both gear groups. In this way it is possible to provide a multiple speed transmission assembly having a larger number of shift ratios than can be conveniently provided in a single unit transmission, while avoiding a complex shift pattern in which several simultaneous shifts of both the main and auxiliary gear groups are required. Previously it was common in multiple speed transmissions, having a main gear group or transmission with normally spaced speed ratios and a serially connected auxiliary gear group or transmission for splitting the ratios in the main transmission, to have each gear group operated with a separate shift lever, all as set forth and explained in detail in said application, Serial No. 133,404.

In the specific embodiment disclosed in said application, a fluid actuated mechanism was utilized with the interlock mechanism of the main gear group for actuating the auxiliary gear group. It is the purpose of this invention to disclose and claim a different structure involving an electrically operated mechanism, also associated with the interlock mechanism of the main transmission, for carrying out the same broad purposes as those effected by the said hydraulic mechanism and for securing certain operating characteristics not present in the specific embodiments previously disclosed.

Accordingly, one of the broad objects of this invention is to provide a multiple speed transmission assembly, including main and auxiliary sections connected in series, whch can be shifted through its entire range by manually actuating only one shift lever.

A further object of the invention is to provide a multiple speed transmission assembly, as aforesaid, which can be so shifted throughout its entire range with one hand and which can be so shifted easily and conveniently.

A further object of the invention is to provide a multiple speed transmission assembly, as aforesaid, wherein the shift of the auxiliary gear group during said simultaneous shift may be performed easily by semi-automatic means at the will of an operator when, but only when, the associated main gear group is in neutral position.

A further object of the invention is to provide a multiple speed transmission assembly, as aforesaid, in which the pressure effecting shifting of the auxiliary gear group is held continuously effective on the auxiliary shifting means in either shifted position thereof.

A further object of the invention is to provide a multiple speed transmission assembly, as aforesaid, in which the means controlling the shifting of the auxiliary gear group are wholly independent of the pressure fluid supply thereto.

A further object of the invention is to provide a multiple speed transmission assembly, as aforesaid, having means preselectable at the will of an operator which will automatically shift said auxiliary gear group when, but only when, the shift rods of the main gear group next after such preselection enter into the position corresponding to the neutral position of said gear group.

A further object of this invention is to provide a mechanism for effecting a shift operation, as aforesaid, which mechanism is simple in construction, easy and economical to fabricate and requires a minimum of maintenance.

A further object of this invention is to provide a mechanism, as aforesaid, which is sufficiently flexible to permit its installation in substantially any conventional type of truck, tractor or similar heavy duty vehicle.

A further object of this invention is to provide a device by which the shifting of the auxiliary gear group in an assembly, as aforesaid, may after preselection by an operator, be automatically effected by electrically actuated control mechanism immediately upon entry of the main gear group into neutral position.

A further object of this invention is to provide control mechanism, as aforesaid, actuable by an interlock mechanism associated with the shift rods of the main transmission.

Other objects and purposes of this invention will become apparent to persons acquainted with this type of equipment upon reference to the accompanying drawing and the following specification.

In the drawing:

Figure 1 is a largely schematic, partially sectional, view of apparatus illustrating and embodying the invention with the shift rods and interlock mechanism in one of their two normal positions and with the sectional portion taken on line I—I of Figure 3.

Figure 2 is a fragmentary view of Figure 1 showing the shift rods and the interlock mechanism in their other position.

Construction in general

Figure 3:
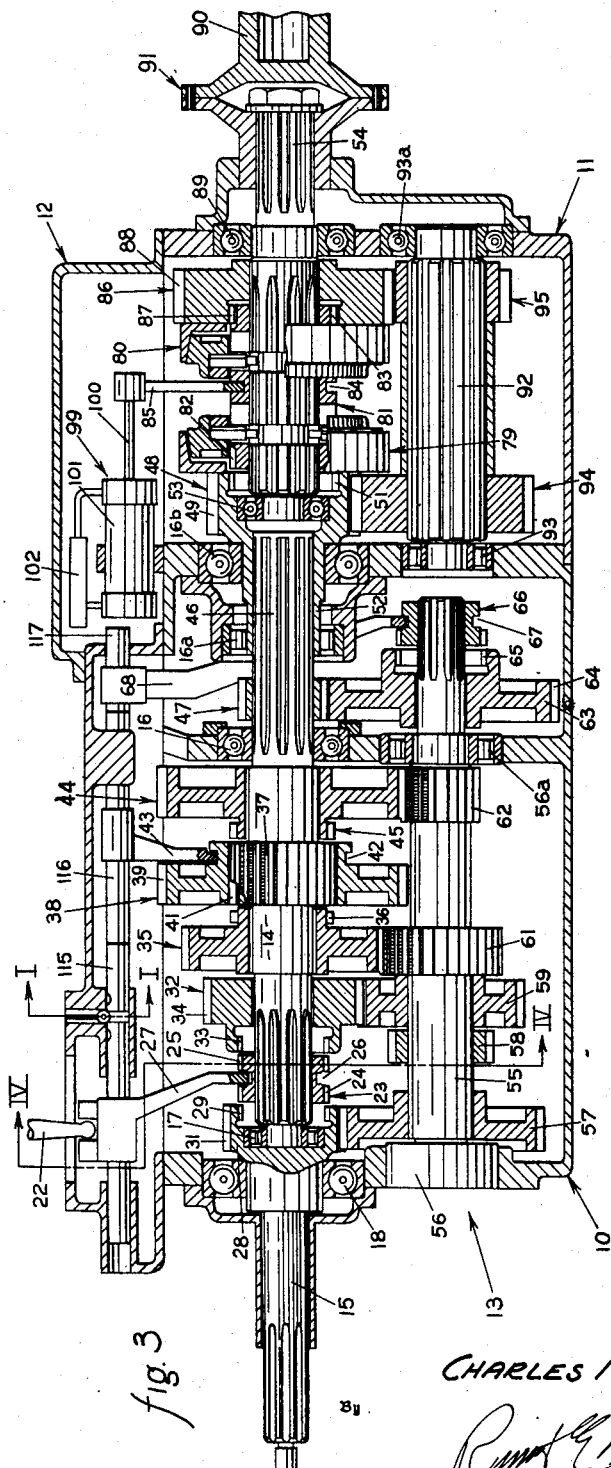
Figure 3 is a central cross sectional view of a transmission assembly, to which this invention relates, taken along a substantially vertical plane through the axes of the main shafts of the main and auxiliary boxes and indicated by the line III—III in Figure 4.

The structure in general comprises fluid (as air) energized actuating means for effecting a shift of the auxiliary gear group, and electrical means operated by the interlock mechanism of the main transmission for controlling said fluid energized actuating means.

More specifically, the fluid energized actuating portion of the device includes a shift fork connected to the auxiliary gear group, a fluid pressure cylinder for actuating the shift fork, a source of fluid under pressure and a valve, responsive to a pair of solenoids, for controlling the flow of said fluid from a source to one end, or the other end, of the cylinder.

The electrical control portion of the device comprises a series circuit having a pair of branches, each branch having a solenoid for moving said valve into one of its operating positions, a manually controlled selector switch for selecting which of said branches is connected to the remainder of said circuit, a source of constant potential and a control switch actuated by the interlock mechanism of the main transmission for energizing or de-energizing the selected one of said solenoids.

Said control switch is normally closed, and so held by a yieldable means, as a spring, and is opened, overpowering said spring, by movement of said interlock mechanism as the gears associated therewith are moved out of neutral position. Whenever the main gear group is in a shifted position the control switch is held open by means actuated by said interlock mechanism, and as soon as the main gear group returns to neutral position said control switch is permitted to close. When the control switch closes, one solenoid or the other is energized, depending upon the position of the selector switch. Thus energized, the solenoids will either move the valve into its other position, or hold it in its present position. Thus, said valve, if held in the same position, will continue to direct fluid under pressure into a cylinder in the same direction as previously and the shift fork of the auxiliary transmission connected for operation by said cylinder, will not move. On the other hand, if the solenoid core moves, it shifts the valve into its other position whereby the pressure fluid will be directed into the opposite end of the cylinder and the shift fork will be actuated to effect a shift of the auxiliary gear group.

Thus, so long as the selector switch is not moved, the main gear group can move into and out of its neutral position freely without effecting a shift of the auxiliary gear group. However, when the selector switch is moved, it will effect such preselection of the control mechanism that, upon the next entry of the main gear group into neutral position, a shift in the auxiliary gear group will be brought about.

Construction in detail

In the specific embodiment of the invention herein disclosed, there is provided a main transmission or box 10, containing a main gear group, which is associated at one end with an auxiliary transmission or box 11, containing an auxiliary gear group in series connection with the main gear group. The other end of the main box 10 is associated with an input shaft 15 connectible with the clutch of a vehicle (not shown). An output shaft 54 extends from the auxiliary box 11 for connection to a propeller shaft 90 in a conventional manner. Said gear groups are here shown in two separate, connected housings for convenience in reference but they may both be enclosed in a single housing if desired without going outside the scope of this invention. The auxiliary gear group is provided with synchronizers 79 and 80, preferably of the friction clutch type.

Although the present invention is not concerned with the details of either the main gear group or the auxiliary gear group, but rather lies in the association and co-action of said gear groups with each other and with the control means herein disclosed, the following description of said gear groups is given by way of example but should be recognized as an example only and not limiting.

The main box

The main box, or the main gear group, may in general be any device comprising an assemblage of gears capable of being shifted to effect two or more different power ratios wherein there exists a main shaft carrying thereon one or more gears normally rotatable with respect thereto but arranged for selective positive clutching to said main shaft to effect ratio changes.

For the purpose of convenience in description, the terms "leftwardly" and "rightwardly," as used in this specification, will be understood to mean leftwardly and rightwardly with respect to the transmission assembly when positioned as appearing in Figure 1. The terms "inwardly" and "outwardly" shall be understood to have reference to the geometric center of the transmission assembly or the sections 10, 11 and 12, thereof. The terms "upper" or "upwardly" and "lower" or "downwardly" shall be understood to refer to the entire assembly when positioned and/or operating in its normal manner of use. The term "one step" or "one-half step," when used with reference to the spacing of gear ratios, connotes the ratio spacing of the usual five-speed transmissions wherein the five speeds extend from low through high to overdrive and each ratio change constitutes one "step." In certain common transmissions now on the market, the adjacent gear sets have percentage steps from one to the next from about 60% to about 90%, but this is illustrative only and not limiting.

With specific reference now to the main box here selected for illustrative purposes, the main transmission box 10 is provided with a centrally disposed main shaft 14 and an input shaft 15, which shafts are preferably co-axial, with their adjacent ends closely spaced from each other within the main transmission section 10. The main shaft 14 is rotatably supported upon the main bearings 16, 16a and 16b within the main box 10 and the pilot bearing 17, said pilot bearing being mounted in and upon the adjacent end of the input shaft 15. The input shaft 15 is rotatably supported in one end of the main box 10 by means of the main bearing 18. The leftward end of the input shaft 15 is splined for conventional coupling usually through a clutch with said power means and is supported by a clutch pilot bearing (not shown).

The leftward end of the main shaft 14 is splined for axially movable support of the clutch member 23 having leftward and rightward sets of external teeth 24 and 25, respectively. The clutch member 23 is provided with a circumferential groove 26 between said teeth for engagement by a clutch fork 27, which fork is actuable by a shift lever 22 in a conventional manner.

The rightward end of the input shaft 15 is provided with an input gear 28 having internal and external teeth 29 and 31, respectively. The internal teeth 29 of the input gear 28 are engagable by the leftward teeth 24 of the clutch member 23 when said clutch member is in its leftward position upon the splined portion of the main shaft 14.

A small floating, low speed, gear 32 which is rotatably supported upon the main shaft 14 adjacent to the clutch member 23, is provided with external teeth 34 and internal teeth 33 selectively engagable by the rightward teeth 25 of said clutch member 23.

A medium floating, second speed gear 35 is rotatably supported upon the main shaft 14 adjacent to the rightward side of said floating gear 32 and is provided with clutch teeth 36. A shaft gear 37 is positioned adjacent to said clutch teeth 36. A ring gear 38, having external teeth 39, is provided with internal teeth 41 whereby said ring gear is supported upon and engaged by the shaft gear 37 and is axially movable leftwardly and rightwardly with respect thereto. The ring gear 38 is provided with a circumferential groove 42 engagable by a clutch fork 43 which clutch fork is actuable by means of the shift lever 22 in a conventional manner.

A large floating, third speed, gear 44, having clutching teeth 45, is rotatably supported upon the main shaft 14 adjacent to the rightward side of the shaft gear 37.

The rightward end 46 of the main shaft 14 is splined in a conventional manner and extends through the rightward end of the main box 10 into the auxiliary box 11. A second ring, overdrive gear 47 has an internally splined, centrally disposed, opening for support upon and engagement with the splined rightward end of the main shaft 14, and is disposed adjacent to the rightward side of the main bearing 16.

A main output gear 48 having external teeth 49, internal teeth 51 and being within the auxiliary transmission box 11, is provided with a hub 52 which is internally splined for engagement with the rightward end 46 of the main shaft 14. The main bearings 16a and 16b encircle the hub 52 for support thereof. A pilot bearing 53 is mounted substantially within the rightward side of the output gear 48 for rotatable support of the leftward end of the auxiliary main shaft 54 hereinafter described.

A main countershaft 55 is rotatably supported within the main box 10, preferably directly below the main shaft 14 and parallel therewith, by the bearings 56 and 56a. A spur gear 57 is secured to the counter shaft 55 adjacent to the bearing 56 for continuous engagement with the external teeth 31 of the input gear 28. A small spur gear 58 is secured to the countershaft 55 adjacent to the rightward side of said gear 57. A medium spur gear 59 is secured to the countershaft 55 adjacent to the rightward side of the small spur gear 58 for continuous engagement with the external teeth 34 of the small floating, low speed, gear 32. A large gear 61 is on the countershaft 55 in continuous engagement with the medium floating, second speed gear 35.

A small countershaft gear 62 is spaced rightwardly from the large countershaft gear 61 and is continuously engageable with the large floating, third speed gear 44.

A countershaft floating gear 63, having external teeth 64 and internal teeth 65, is rotatably supported upon the countershaft 55 adjacent to the rightward side of the bearing 56a.

The rightward end of the countershaft 55 is splined in a conventional manner. A clutch member 66, having a circumferential groove 67, is provided with an internally splined, centrally disposed opening for axially slidable support of the member upon the splined rightward end of the countershaft 55. The clutch member 66, which is adjacent to the floating gear 63, has external teeth engagable by the internal teeth 65 of the said floating gear 63. The circumferential groove 67 is engaged by a clutch fork 68 which is actuable by the shift lever 22 in a conventional manner. The external teeth 64 of the floating gear 63 are continuously engagable by and with the second ring, or overdrive, gear 47.

Figure 5:
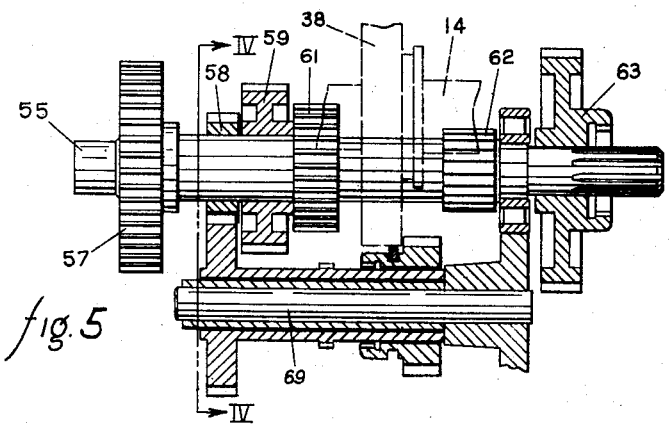
Figure 5 is a sectional view of said transmission assembly taken substantially along the line V—V of Figure 4 and showing a portion of the main box output shaft in broken lines.

A reverse idler shaft 69, (Figure 5) is secured within the main transmission box 10, is disposed parallel with the countershaft 55, and is spaced substantially horizontally therefrom. Since it is provided with conventional gearing and operated in a conventional manner, detailed description thereof is considered unnecessary and is accordingly omitted.

*The auxiliary box*

While a wide variety of specific gear structures, including planetary, may be utilized in the auxiliary box, hereinafter described construction has been found satisfactory and will be described in detail for illustrative purposes. However, whatever specific arrangement is utilized, it will usually provide two ratios of power transmission which ratios differ by an amount normally equal to the entire range of the main box, including overdrive, plus about one half step. Alternatively, however, the auxiliary box ratios may differ by an amount equal to, or a little greater than, some other selected portion of the main box gears.

The auxiliary main shaft 54 is disposed within the auxiliary box 11 and is coaxial with the main shaft 14. Its leftward end is supported by the bearings 53 and a point near its rightward end is supported by the bearing 89. The extreme rightward end of the auxiliary shaft 54 is splined in a conventional manner for engagement with a propeller shaft 90 by means of any conventional, convenient, coupling 91. A clutch sleeve 81 is slidably supported upon the auxiliary shaft 54 adjacent to the main output gear 48 and is engaged for rotation with shaft 54 by suitable splining.

The clutch sleeve 81 is provided with leftward and rightward rings of external teeth 82 and 83, respectively, adjacent to the axial faces thereof; and a circumferential groove 84 is disposed intermediate the rings of teeth. The circumferential groove 84 is engaged by a clutch fork 85, secured to a semi-automatic shifting device, hereinafter described in detail, for reciprocable movement of the clutch sleeve 81 on the auxiliary shaft 54. The leftward teeth 82 of the clutch sleeve 81 are controllably engagable with the internal teeth 51 of the main output gear 48, such control being effected by the synchronizing clutch 79 when the clutch sleeve 81 is moved leftwardly along the auxiliary main shaft 54. An auxiliary output gear 86 which is rotatably supported upon the auxiliary main shaft 54 adjacent to the rightward side of clutch sleeve 81, is provided with internal teeth 87 and external teeth 88. The rightward ring of teeth 83 on the clutch sleeve 81 is controllably engagable with the internal teeth 87 of the output gear 86, said control being effected by the synchronizing clutch 80 when the clutch sleeve 81 is moved rightwardly along the auxiliary main shaft 54.

The synchronizing clutches 79 and 80, may be of any convenient and conventional type, such as the cone clutch disclosed and described in Patent No. 2,468,155. Hence, detailed description thereof is omitted here.

It will be understood that the capacity of these synchronizers for best results, will be sufficient to effect substantial synchronization during the time the shift lever is passing through neutral position at a relatively rapid rate, and preferably during the first half of such passage; having in mind that the entire shift will normally take about 0.6 second on an upshift and about 1.8 seconds on a downshift. Thus, substantial synchronization will preferably be completed in less than 0.5 second and to accomplish this the synchronizers must be of relatively large capacity. Nevertheless, successful operation will be secured if there is only a sufficient approximation of synchronization in the auxiliary box to permit prompt shifting of the main box and actual shifting of the auxiliary will in some instances actually be completed after the main box has been shifted.

An auxiliary countershaft 92 (Figure 3), which is preferably parallel with the auxiliary main shaft 54 and spaced downwardly therefrom, is rotatably supported at its extremities within the auxiliary box 11 by the bearings 93 and 93a. A large gear 94 is supported upon the auxiliary countershaft 92 near its leftward end for rotation therewith and continuous engagement with the external teeth 49 of the main output gear 48. A pinion gear 95 is supported upon the auxiliary countershaft 92 near its rightward end for rotation therewith and continuous engagement with the external teeth 88 of the auxiliary output gear 86.

Thus, in this embodiment, the auxiliary box 11 is provided with gears effecting a direct drive and one reduction ratio. The difference between the direct drive and reduction ratios of the auxiliary box in this embodiment of the invention is approximately one half step greater than the entire speed range between first and fifth gear ratios provided in the main box 10.

The following table discloses in detail the gear ratios used in this embodiment and which have been found to operate satisfactorily in the main transmission box of a unit and auxiliary transmission assembly of an otherwise conventional truck:

| Gear Position | Gear Ratio | Percent Step Between Adjacent Sets |
|---|---|---|
| First | 2.10 | 28 |
| Second | 1.64 | 29.5 |
| Third | 1.27 | 27 |
| Fourth (direct) | 1.00 | 28 |
| Fifth (overdrive) | 0.779 | |

The reduction drive gear ratio in the auxiliary box, for use with the above ratios in the main box, was found to be satisfactory at 3.55. Thus, the ratios provided in the main box are substantially equal, approximately half-step, ratios, as "half-step" is defined above. The ratio provided in the auxiliary box when in reduction position spans the entire main box ratios (2.69 in the example above) plus about one half-step (in this case 32 per cent):

| Transmission Position | Main Box Position | Auxiliary Box Position | Over-All Position |
|---|---|---|---|
| 1 | First | Reduction | 7.45 |
| 2 | Second | do | 5.82 |
| 3 | Third | do | 4.49 |
| 4 | Fourth (direct) | do | 3.55 |
| 5 | Fifth (overdrive) | do | 2.76 |
| 6 | First | Direct | 2.10 |
| 7 | Second | do | 1.64 |
| 8 | Third | do | 1.27 |
| 9 | Fourth | do | 1.00 |
| 10 | Fifth (overdrive) | do | 0.779 |

It will be understood that the above description of the main transmission box 10 and the auxiliary transmission box 11 is given in detail for illustrative purposes, only, and it is not intended that the specific details thereof impose any limitation upon the scope of the invention.

*Auxiliary box actuating means*

The means for actuating the auxiliary box may be any of a wide variety of power devices to move the shiftable member of the auxiliary box, when, and only when, the operator moves a suitable preselecting device and the main box thereafter comes into neutral position. The operating parts may be placed anywhere which is convenient and consistent with their effective operation. The specific device hereinafter described will illustrate one effective embodiment.

As shown in Figure 3, the auxiliary box actuating section 12 is preferably mounted on, or adjacent to, the auxiliary transmission box 11 for semiautomatic actuation of the auxiliary clutch sleeve 81. The actuating section 12 contains an automatic shift control mechanism 99 (Figures 1 and 3) comprising a double acting actuating cylinder 101, an actuation arm 100, and a two-way selector valve 102 of any conventional type, which is connected in a conventional manner by means of pipes 103 and 104 to said cylinder 101. Although the cylinder 101 is hereinafter described and disclosed as an air cylinder, which may be either pressure or vacuum, it will be understood that said cylinder may also be actuated hydraulically. A vacuum system is hereinafter assumed for illustrative purposes.

The selector valve 102 is in turn connected to a vacuum tank 108, by means of the pipe 109. The vacuum in the tank 108 may be maintained therein by the engine manifold, not shown, through the pipe 111 which communicates with the tank 108. A check valve 110 may be placed in the pipe 111 to retain the vacuum in tank 108 when the manifold pressure rises.

The selector valve 102 is actuated by the plunger 131 of the solenoid, said solenoid having independent windings 132 and 133. Said valve 102 is of the conventional type wherein the parts thereof are so proportioned that when said valve is fully moved into either position, continued pressure on the inlet side thereof will tend to hold said valve structure in whichever position it then occupies. Thus, regardless of which way the valve is shifted, continued suction from the vacuum tank 108 will tend to hold the valve in that shifted position.

Said plunger 131 is operatively associated with the solenoid windings 132, and 133 in such a manner that the energization of the winding 132 will move said plunger 131 rightwardly, as appearing in the drawing, and energization of the winding 133 will move said plunger 131 leftwardly, whereby corresponding movement of the mechanism of said valve 102 is brought about. Said solenoid is of any conventional type and, in the particular circuit here utilized to illustrate the invention, each winding thereof is connected through a manually controlled, conventional selector switch 134 to a series circuit 135 which includes, in addition to the selector switch 134, the normally closed control switch 136 and a source 137 of constant potential. The selector switch 134 is manually actuated by any conventional means under the direct control of the operator, such as a selector lever 138 mechanically connected to said switch 134 by a rod 139, and which operates to determine which of said solenoid windings is at a given moment connected to the source 137.

Figure 6:
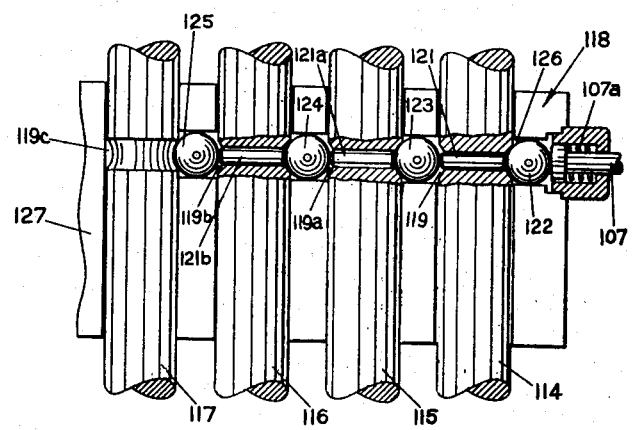
Figure 6 is a fragmentary view of the shift rods in their neutral position and further showing the interlock mechanism.
Figure 4:
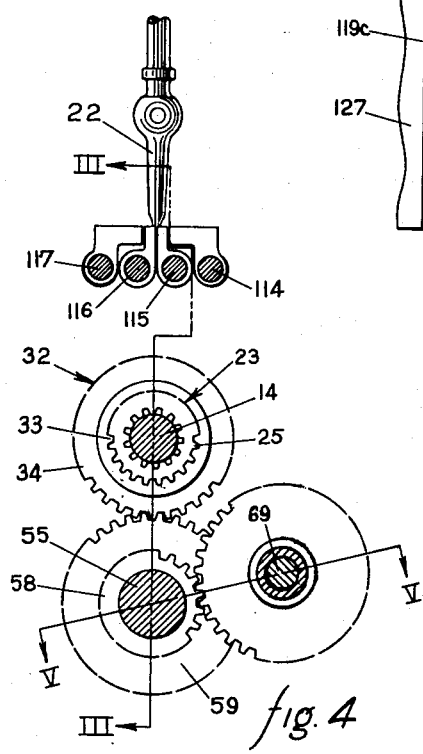
Figure 4 is a sectional view of the main gear box taken along the line IV—IV of Figure 3.

The shift rods 114, 115, 116, and 117 and the interlock means 118 associated therewith may be of conventional form, such as those illustrated in said application Serial No. 33,404 or as further illustrated in detail in the United States Patent to Padgett No. 1,943,694. Said shift rods are conventionally and reciprocably supported in means, such as the guide block 127, located within the housing of the main box 10, as shown in Figures 3 and 6. Each shift rod has an annular groove 119 (Figures 2 and 6), which grooves are aligned with respect to each other in a direction perpendicular to the axes of said shift rods when said main gear group is in neutral position. The openings 120 (Figure 2) which extend through the shift rods 114, 115 and 116, communicate with diametrically opposite portions of the grooves 119. Pins 121 are slidably disposed within each opening 120 and balls 123, 124 and 125 are disposed between the shift rods and engageable by the pins 121. Each ball is substantially equal in diameter to the distance between the shift rods on either side thereof plus the depth of the groove 119 in one of said rods. The pins 121 are equal in length to the diameter of the respectvie shift rods with which each is associated less the depth of the groove therein. A cylindrical retaining passageway 126 is provided in the guide block 127 transversely of the shift rods for preventing movement of the balls out of their alignment with each other when one of the shift rods, together with the pins 121 therein, is moved during a shift of the main box. There are as many balls as shift rods, with one ball 122 disposed laterally outwardly of and adjacent to the shift rod 114.

The several balls and pins 121 cooperate with the grooves 119 to provide an interlock mechanism which prevents more than one shift rod from leaving neutral position at any one time.

When one of the shift rods, here for illustration the rod 116, is shifted out of neutral position (Figure 1), the balls, the pins and the rod 116 cooperate to urge the actuating pin 107 rightwardly, as appearing in Figure 1, against the compression of the spring 107a to open the control switch 136, which is preferably a toggle type of micro-switch.

When the shift rods are all in neutral (Figure 2), the spring 107a moves the actuating pin 107 leftwardly away from the control switch 136, whereby said switch is closed, thereby energizing the circuit 135 and whichever solenoid winding is connected therewith.

Operation

Inasmuch as the particular main gear group and auxiliary gear group above described are conventional, their operation will be understood without description. However, reference may, if desired, be made to said application Serial No. 133,404 for a detailed description of the operation of this particular main and auxiliary gear assembly.

The interengagement of the various corresponding gears within the transmission assembly 13, for the purpose of effecting the various above mentioned gear ratios, may be accomplished in a conventional manner by means of the shift lever 22 and the shift rods 114, 115, 116 and 117.

The clutch sleeve 81 in the auxiliary box 11 is moved axially along the auxiliary main shaft 54 (Figure 3) by means of the actuating arm 100 of the air cylinder 101 acting through the clutch fork 85. When the clutch sleeve 81 is in the leftward position it engages the output gear 48, thereby effecting a direct drive through the auxiliary box 11. When the clutch gear 81 is in the rightward position (Figure 3), it engages the auxiliary output gear 86, thereby effecting a reduction drive through the auxiliary box 11. The synchronizing clutches 79 and 80 provide means for reducing the speed of the main shaft 14 prior to engagement between the clutch sleeve 81 and the main output gear 48, in a conventional manner, and for speeding up the main shaft 14 and auxiliary countershaft 92 prior to engagement between the clutch sleeve 81 and the auxiliary output gear 86, also in a conventional manner.

Turning now to the operation of the shift control means, it should be borne in mind that the shift of the auxiliary gear group must be made very quickly in order to be completed before the speed of the power means driving the entire transmission assembly has retarded beyond the point at which engagement of the gears in the new shift position may be made. Since this normally requires less than a second, the need for a rapid shift is apparent.

Thus, the shift fork 85, when positioned as appearing in solid lines (Figure 1), effects a reduction drive through the gears in the auxiliary box 2 and, when positioned as appearing in broken lines (Figure 1), said fork effects a direct drive through said auxiliary box. It will be assumed for descriptive purposes that movement of the plunger 131 leftwardly will direct pressure fluid into the leftward end of the cylinder 101 and movement of said plunger 131 rightwardly will direct pressure fluid into the rightward end of said cylinder 101.

It will also be assumed that flow of fluid into the leftward end of the cylinder 101 will move the shift fork 85 into its rightward, or gear reduction, position and flow of pressure fluid into the rightward end of cylinder 101 will move said shift fork 85 into its leftward, or direct drive, position. These assumptions are all consistent with a preferred embodiment of the apparatus but are here designated for illustrative purposes only. It will be evident that they may be altered without destroying the purposes or scope of the invention.

Therefore, in starting a vehicle equipped with the improved transmission of this invention in its lowest gear, the selector lever 138 will be in its downward position and solenoid winding 132 will be connected to the source 137, the valve 102 will be so positioned that pressure fluid will be introduced into the leftward end of the cylinder 101 and the shift fork 85 will be in its rightward position.

As the vehicle gathers speed and the gears in the main gear group are shifted from the lowest ratio to the highest ratio in conventional manner by the operation of the shift lever 22, the control switch 136 is closed each time the main gear group, and consequently the interlock mechanism, comes into its neutral position. This closes the circuit 135 but, since such closing still energizes only the winding 132, the energization of circuit 135 effects no change in position of the solenoid plunger 131 and consequently no change in the position of the valve 102. Thus, the pressure fluid continues constantly to be directed to the leftward end of the cylinder 101 and the shift fork 85 continues to be held in its rightward, or reduction, position under the constant suction within the vacuum source 108.

However, if upon reaching the end of the available ratios in the main gear group the operator desires to shift the auxiliary gear group into its direct drive position and to return the main gear group to its lowest ratio in order to continue the progression of the entire transmission unit through its several ratios, the selector lever 138 is moved into its upward position while the main gear group is still in a shifted position. This will place the apparatus in the position shown in Figure 1, wherein said selector lever is in its upward position but the shift fork 85 is still in its rightward, or reduction, position.

When the main transmission now moves into its neutral position, and the balls fall into the several rod grooves (Figure 2), the control switch 136 closes and the circuit 135 is energized. Because the selector switch 134 now connects the solenoid winding 133 to the source 137, in place of the solenoid winding 132 formerly connected, the closing of the control switch 136 now energizes the said solenoid winding 133 and causes the plunger 131 to move rightwardly. In this position the valve 102 directs pressure fluid into the rightward end of the cylinder 101 and the shift fork 85 is moved in a leftward direction.

The first reaction to movement of the clutch sleeve 81 leftwardly is a synchronization of its rotational speed with the speed of the main output gear 48 by means of the synchronizing clutch 79. When this synchronization has been accomplished, the clutch sleeve 81, under the continuing urging of the pressure fluid, shifts the auxiliary box from reduction to direct drive. The main box 19 can be shifted by means of the shift lever 22 into its low gear position as soon as said synchronism is effected, whether or not the clutch sleeve 81 has actually completed its shift. Accordingly, the shift lever 22 is simultaneously moved from its high position to its low position and the shift from direct drive in the main box and reduction drive in the auxiliary box to low ratio in the main box and direct drive in the auxiliary box is completed. The shift progression may then be continued in the main box as desired and in a conventional manner.

Down-shifting of the transmission is carried out in the same manner as described above for up-shifting excepting only that the motions are in the reverse direction.

It will be observed that when the auxiliary gear group has once shifted as a result of a movement of the selector lever 138 followed by entry of the main gear group into neutral, the main gear group may thereafter enter and leave neutral as often as desired without effecting any further shift of the auxiliary gear group. Likewise, it will be observed that so long as the main gear group does not enter into its neutral position, the selector lever 138 may be moved upwardly or downwardly as often as desired without effecting any change in the auxiliary gear group. Shifting of the auxiliary gear group is, therefore, effected only by a movement of the lever 138 from one position into its other position followed by movement of the main gear group into neutral position.

Inasmuch as the pressure fluid is at all times effective on the cylinder 101, (1) there is practically no chance that the auxiliary gears will come out of either shifted position accidentally and (2) the continuation of this pressure even after completion of the shift in the main gear group makes it possible for the shift in the main gear group to be completed first and the shift in the auxiliary gear group may then follow as soon as the synchronizing mechanism therein permits.

Persons familiar with this general type of equipment will also recognize that by having the fluid pressure continuously effective in said cylinder, it will be possible during a shifting operation momentarily to reengage the clutch and simultaneously either increase or decrease the speed of the engine for up-shift or down-shifting, respectively, and thereby assist the auxiliary gear group to complete its shift.

It will also be recognized that the provision of the electrical control means for determining the flow of pressure fluid will constitute a positive and reliable apparatus, one not readily subject to improper operation and means wholly independent of the pressure fluid system.

It will be noted that since the main gear group will normally be in gear during operation of the transmission, and accordingly one of the shift rods will be out of neutral position, the circuit 135 will be broken by the control switch 134 during a majority of the time and, therefore, the power source 137 will not be unreasonably depleted. When the vehicle with which the above described control mechanism is used is not in operation, the circuit 135 may be broken by the ignition key of said vehicle or by other conventional means arranged in a conventional manner.

Although the above mentioned drawing and description apply to one particular preferred embodiment of my invention, it is not my intention, implied or otherwise, to eliminate other variations or modifications which do not depart from the scope of the invention unless specifically stated to the contrary in the hereinafter appended claims.

I claim:

1. In a multiple speed transmission, the combination comprising: a first gear group having shift rods and an interlock mechanism associated therewith, and a second gear group having friction clutch synchronizing means and means serially connecting said second group with said first group, said second gear group having a ratio not materially less than the ratio in the first gear group between its low position and its direct drive position; shifting means automatically actuable upon entry of said first gear group into neutral position for initiating engagement of said synchronizing means and effecting shifting of said second gear group, said shifting means including power means effecting engagement of said synchronizing means and effecting the shifting of said second gear group upon substantial completion of synchronization; energizing means comprising an electric circuit for effecting energization of said power means; control means operable to open said circuit; and actuating means associated with, and operable by, said interlock mechanism for operating said control means, and thereby opening said circuit, when said first gear group is in a shifted position, means causing said circuit to close immediately upon the entry of said first gear group into neutral position.

2. In a multiple speed transmission having a main gear group and an auxiliary gear group in series therewith, said second gear group having a ratio not materially less than the ratio in the first gear group between its low position and its direct drive position the combination comprising: a plurality of shift rods for effecting a shift of the main gear group and an interlock mechanism associated with said shift rods; friction clutch synchronizing means associated with said auxiliary gear group; a source of fluid under pressure; fluid actuated means connected to said source and shift means operable thereby for automatically initiating said synchronizing means and shifting said auxiliary gear group; a source of electric energy and a control switch and means actuated by said interlock mechanism for opening said control switch when said main gear group is in gear; a manually controllable selector switch and means connecting said source of electric energy, said control switch and said selector switch in series circuit; and an electrically responsive two-position valve having a pair of solenoid windings, said windings being alternatively connected through said selector switch to said series circuit for controlling the direction of actuation of said fluid actuated means; means operable from said interlock mechanism for closing said control switch when main gear group is in neutral, whereby said valve is moved from one position to the other or held in a selected position depending upon the position of said selector switch.

3. In a transmission assembly having a main gear group, an auxiliary gear group, said second gear group having a ratio not materally less than the ratio in the first gear group between its low position and its direct drive position and a plurality of shift rods for said main gear group and an interlock mechanism associated therewith, a shift control for the auxiliary gear group comprising in combination: a source of fluid under pressure and a fluid driven actuator connected thereto; shift means connected to said actuator for shifting said auxiliary gear group; a two-position valve controlling the direction of flow of fluid to said actuator; electrically responsive means controlling the position of said valve and a source of electric power for energizing same; a manually controllable selector switch controlling the flow of energy from said power source to said electrically responsive means for urging said valve into one position or the other position, and a normally closed control switch in series with said power source and said selector switch; actuating means associated with said interlock mechanism for holding said control switch open whenever said main gear group is out of neutral position.

4. A device for shifting an auxiliary gear group having a shift fork and being in series association with a main gear group, said second gear group having a ratio not materially less than the ratio in the first gear group between its low position and its direct drive position, said main gear group having a plurality of parallel, spaced shift rods and an interlock mechanism comprising a circumferential groove on each of the shift rods, a ball positioned between each of said shift rods and disposable within said grooves, and co-axial pins slidably extending through said shift rods in communication with said grooves, said grooves, balls and pins benig on a common axis perpendicular to the axes of said shift rods when said main gear group is in neutral position, the combination comprising: a fluid responsive actuating cylinder and means operatively connecting the piston thereof to said shift fork; a source of fluid under pressure and conduits connecting same to each end of said cylinder; a two-position valve interposed in said conduits; a two-winding solenoid having an axially reciprocable plunger connected to said valve for moving same in response to the movement of said plunger; a source of electric power, a microswitch and a selector switch and means connecting said three last-named elements and the solenoid windings in a branched series circuit wherein said windings are in parallel with each other and the position of said selector switch determines which of said windings is connected with the other elements of said circuit; manually actuable means for operating said selector switch; an actuating pin co-axial with the assembly of said balls and pins and means supporting said actuating pin for axial movement thereof; a further ball snugly disposed between said actuating pin and the adjacent shift rod and engageable by the pin therein; resilient means urging said actuating pin toward said shift rods, means supporting said micro-switch for actuating and opening by said actuating pin when said main gear group is in gear and for closing said micro-switch when said main gear group is in neutral.

5. In a multiple speed transmission, the combination comprising: a first gear group having shift rods and a second gear group having friction clutch synchronizing means and means serially connecting said second group with said first group, said second gear group having a ratio not materially less than the ratio in the first gear group between its low position and its direct drive position; shifting means automatically actuable upon entry of said first gear group into neutral position for initiating engagement of said synchronizing means and effecting shifting of said second gear group, said shifting means including power means effecting engagement of said synchronizing means and effecting the shifting of said second gear group upon substantial completion of synchronization; energizing means comprising an electric circuit for effecting energization of said power means; control means operable to open said circuit; and actuating means associated with, and operable by, said shift rods for operating said control means, and thereby opening said circuit in a shifted position and causing said circuit to close immediately upon the entry of said first gear group into neutral position.

6. In a multiple speed transmission, the combination comprising: a first gear group having shift rods and a second gear group having friction clutch synchronizing means and means serially connecting said second group with said first group, said second gear group having a ratio not materially less than the ratio in a selected portion of the first gear group; shifting means automatically actuable upon entry of said first gear group into neutral position for initiating engagement of said synchronizing means and effecting shifting of said second gear group, said shifting means including power means effecting engagement of said synchronizing means and effecting the shifting of said second gear group upon substantial completion of synchronization; energizing means comprising an electric circuit for effecting energization of said power means, said circuit including a manually operable selector switch for controlling the direction of operation of said power means; control means operable to open said circuit; and actuating means associated with, and operable by, said shift rods for operating said control means, and thereby opening said circuit in a shifted position and causing said circuit to close immediately upon the entry of said first gear group into neutral position.

7. In a multiple speed transmission, the combination comprising: a first gear group operable by manually shiftable means; a second gear group having friction clutch synchronizing means and means serially connecting said second group with said first group, said second gear group having a ratio not materially less than the ratio in a selected portion of the first gear group; shifting means automatically actuable upon entry of said first gear group into neutral position for initiating engagement of said synchronizing means and effecting shifting of said second gear group, said shifting means including power means effecting engagement of said synchronizing means and effecting the shifting of said second gear group upon substantial completion of synchronization, energizing means comprising an electric circuit for effecting energization of said power means, said circuit including a manually operable selector switch for controlling the direction of operation of said power means; control means operable to open said circuit, and actuating means associated with, and operable by, said manually shiftable means for operating said control means, and thereby opening said circuit in a shifted position and causing said circuit to close immediately upon the entry of said first gear group into neutral position.

8. In a multiple speed transmission, the combination comprising: a first gear group having shift rods and a second gear group having frictionally actuated synchronizing means and means serially connecting said second group with said first group, said second gear group having a ratio not materially less than the ratio in a selected portion of the first gear group; shifting means automatically actuable upon entry of said first gear group into neutral position for initiating engagement of said synchronizing means and effecting shifting of said second gear group, said shifting means including power means effecting engagement of said synchronizing means and effecting the shifting of said second gear group upon substantial completion of synchronization; energizing means comprising an electric circuit for effecting energization of said power means, said circuit including a manually operable selector switch and a normally open control switch; an electrically responsive two position valve energized by said circuit to occupy one position or the other according to the position of said selector switch and connected to said power means for controlling the direction of operation of said shifting means; control means operable from said shift rods for closing said control switch immediately upon the entry of said first gear group into neutral position.

9. In a multiple speed transmission, the combination comprising: a first gear group having manually shiftable means and a second gear group having frictionally actuated synchronizing means and means serially connecting said second group with said first group, said second gear group having a ratio not materially less than the ratio in a selected portion of the first gear group; shifting means automatically actuable upon entry of said first gear group into neutral position for initiating engagement of said synchronizing means and effecting shifting of said second gear group, said shifting means including power means effecting engagement of said synchronizing means and effecting the shifting of said second gear group upon substantial completion of synchronization; energizing means comprising an electric circuit for effecting energization of said power means, said circuit including a manually operable selector switch and a normally open control switch; an electrically responsive two position valve energized by said circuit to occupy one position or the other according to the position of said selector switch and connected to said power means for controlling the direction of operation of said shifting means; control means operable from said manually shiftable means for closing said control switch immediately upon the entry of said first gear group into neutral position.

CHARLES M. PERKINS.

References Cited in the file of this patent
UNITED STATES PATENTS

| Number | Name | Date |
|---|---|---|
| 1,943,694 | Padgett | Jan. 16, 1934 |
| 2,100,312 | Fawick | Nov. 30, 1937 |
| 2,365,732 | Snow | Dec. 26, 1944 |
| 2,445,716 | Sternberg | July 20, 1948 |
| 2,465,885 | Koster et al. | Mar. 29, 1949 |
| 2,522,228 | Hukill | Sept. 12, 1950 |